(12) United States Patent
Popescu

(10) Patent No.: US 9,939,928 B2
(45) Date of Patent: Apr. 10, 2018

(54) MOUSE CAGE

(71) Applicant: Sandra Popescu, Toronto (CA)

(72) Inventor: Sandra Popescu, Toronto (CA)

( * ) Notice: Subject to any disclaimer, the term of this patent is extended or adjusted under 35 U.S.C. 154(b) by 31 days.

(21) Appl. No.: 15/264,497

(22) Filed: Sep. 13, 2016

(65) Prior Publication Data

US 2018/0074603 A1    Mar. 15, 2018

(51) Int. Cl.
| | |
|---|---|
| *G06F 3/0354* | (2013.01) |
| *G06F 3/01* | (2006.01) |
| *G06F 3/039* | (2013.01) |
| *G06F 3/03* | (2006.01) |
| *G06F 3/041* | (2006.01) |

(52) U.S. Cl.
CPC .......... *G06F 3/03543* (2013.01); *G06F 3/014* (2013.01); *G06F 3/0304* (2013.01); *G06F 3/039* (2013.01); *G06F 3/03541* (2013.01); *G06F 3/041* (2013.01); *G06F 2203/0333* (2013.01)

(58) Field of Classification Search
CPC ...... G06F 3/03543; G06F 3/014; G06F 3/011; G06F 3/041; G06F 3/0304; G06F 3/03541; G06F 3/039
USPC ................. 345/164, 156, 157, 158
See application file for complete search history.

(56) References Cited

U.S. PATENT DOCUMENTS

| | | | | |
|---|---|---|---|---|
| 6,097,374 | A * | 8/2000 | Howard ................ | G06F 3/011 345/157 |
| 6,850,224 | B2 | 2/2005 | Baughman | |
| 7,057,604 | B2 | 6/2006 | Bajramovic | |
| 8,125,448 | B2 | 2/2012 | Ranta et al. | |
| 2002/0024500 | A1* | 2/2002 | Howard ................ | G06F 3/014 345/158 |
| 2003/0076296 | A1 | 4/2003 | Kolybaba | |
| 2005/0190155 | A1 | 9/2005 | Pollenz | |
| 2006/0033710 | A1* | 2/2006 | Bajramovic ........... | G06F 1/163 345/156 |
| 2010/0201625 | A1 | 8/2010 | Urbach | |
| 2017/0010683 | A1* | 1/2017 | Pizio .................. | G06F 3/03543 |

* cited by examiner

*Primary Examiner* — Fred Tzeng
(74) *Attorney, Agent, or Firm* — McAndrews, Held & Malloy, Ltd.

(57) ABSTRACT

The disclosure herein is directed to a computer mouse device, comprising: a) a base comprising a mouse device portion, front mouse pad portion, a left mouse pad portion, a right mouse pad portion, a wrist portion, one more wrist portion mounts, one or more rib mounts, a top surface and a bottom surface; b) an optical computer mouse cage comprising one or more ribs connected to the front mouse pad portion, the left mouse pad portion and/or the right mouse pad portion and traversing to the wrist portion of the base, wherein the ribs have a curved contour for accommodating an optical computer mouse positioned at the mouse pad portion grasped by a user's hand; and c) at least one wrist clamp or wrist strap connected to a left side and a right side of the wrist portion.

19 Claims, 10 Drawing Sheets

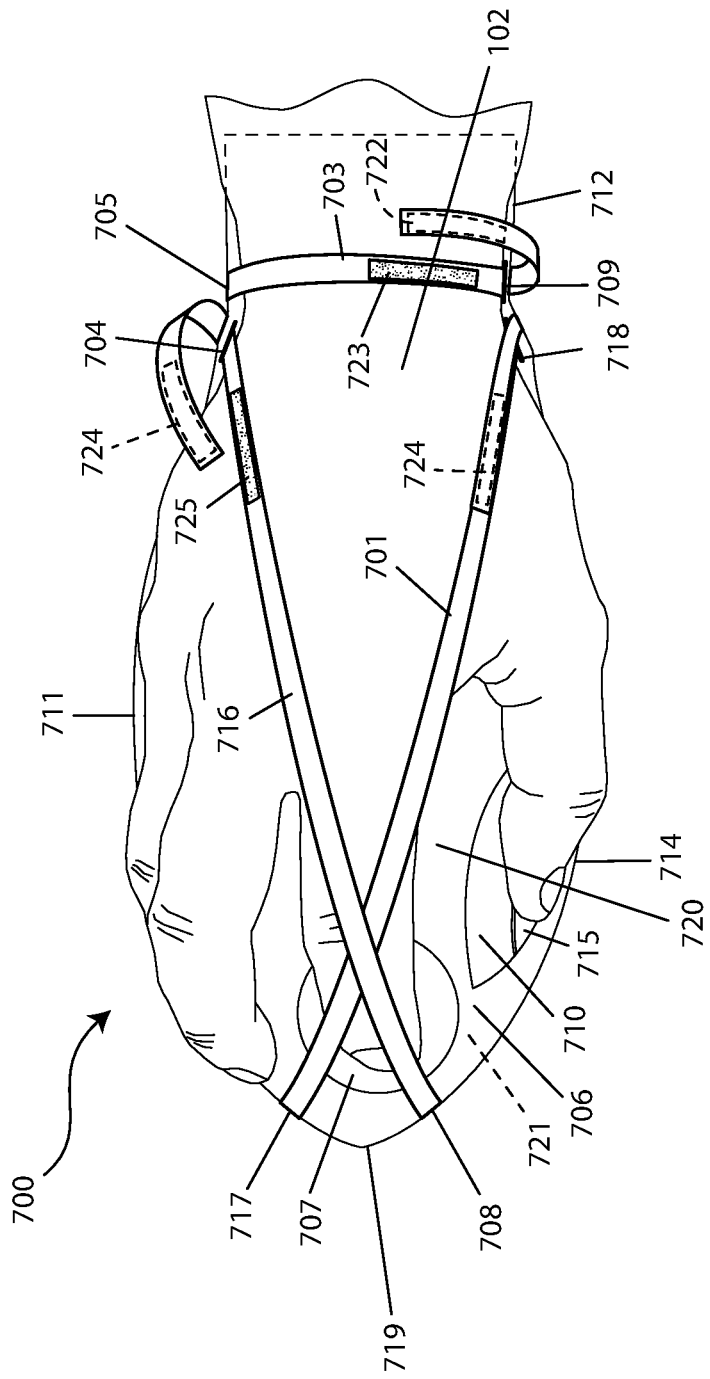

MOUSE CAGE

FIELD OF THE INVENTION

The present disclosure is in the field of computer mouse devices.

BACKGROUND OF THE DISCLOSURE

Continuous use of a computer mouse while operating a computer can lead to repetitive stress injuries. The position of an arm bent at the elbow at the same angle for multiple hours every day, while operating a table-top mouse, will cause the computer user to experience various degrees of discomfort and fatigue manifested by musculoskeletal stress and strain in the user's hand, wrist, arm, elbow, and shoulder, further leading to repetitive strain injuries of various degrees.

There is an unmet need for a further developed computer mouse that would permit the user to operate the computer mouse with his or her hand, wrist, elbow, shoulder and/or arm in a relaxed and/or extended position respecting the natural position of one's body. In this aspect, it also would be desirable for a user to be able to position his or her hand and arm in any position relative to their body while operating a computer mouse. As such, it would be desirable to operate the computer mouse, whereby the user's arm is in a relaxed and extended position at his or her side and/or at any angle relative to their body.

Therefore, there remains a need for a computer mouse that is more effective at limiting various musculoskeletal injuries, such as repetitive strain injuries, carpal tunnel syndrome, tennis elbow, shoulder rotator cuff injury, muscle spasm or strain, tendonitis, ligament strains and/or joint dysfunction.

SUMMARY OF THE INVENTION

Disclosed herein is a computer mouse device, comprising: a) a base comprising a mouse pad portion, front mouse pad portion, a left mouse pad portion, a right mouse pad portion, a wrist portion, one or more wrist portion mounts, one or more rib mounts, a top surface and a bottom surface; b) an optical computer mouse cage comprising one or more ribs connected to the front mouse pad portion, the left mouse pad portion and/or the right mouse pad portion and traversing to the wrist portion of the base, wherein the ribs have a curved contour for accommodating an optical computer mouse positioned at the mouse pad portion grasped by a user's hand; and c) at least one wrist clamp or wrist strap connected to a left side and a right side of the wrist portion, wherein the at least one wrist clamp or wrist strap comprises a fastener capable of being latched about a user's wrist, wherein the computer mouse device is engaged with a wrist and hand of the user via the at least one wrist clamp or wrist strap and the at least one wrist clamp or wrist strap fastener and the optical computer mouse cage whereby the one or more ribs traverse with the curved contour over a back of the hand of the user grasping the optical computer mouse, and wherein the optical computer mouse is positioned on the mouse pad portion of the base portion and manually operated by the user's hand in any position relative to a user's body.

In another aspect disclosed herein is a rollerball computer mouse, comprising: a) a rollerball base comprising a front rollerball portion, a left rollerball portion, a right rollerball portion, a rollerball wrist portion, one or more wrist portion mounts, one or more rib mounts, an upper surface and a bottom surface; b) a rollerball computer mouse cage comprising one or more ribs connected to the front rollerball portion, the left rollerball portion and/or the right rollerball portion and traversing to the rollerball wrist portion of the rollerball base, wherein the ribs have a curved contour for accommodating a user's hand grasping the upper surface of the rollerball computer mouse; and c) at least one wrist clamp or wrist strap connected to a left side and a right side of the rollerball wrist portion, wherein the at least one wrist clamp or wrist strap comprises a fastener capable of being latched about a user's wrist, wherein the rollerball computer mouse is engaged with a wrist and hand of the user via the at least one wrist clamp or wrist strap and the at least one wrist clamp or wrist strap fastener and the rollerball computer mouse cage whereby the one or more ribs traverse with the curved contour over a back of the hand of the user grasping the rollerball computer mouse, and wherein the rollerball computer mouse is manually operated by the user's hand in any position relative to a user's body.

In yet another aspect disclosed herein is a touch computer mouse, comprising: a) a touch base comprising a front touch portion, a left touch portion, a right touch portion, a touch wrist portion, one more wrist portion mounts, one or more rib mounts, an upper surface and a bottom surface; b) a touch computer mouse cage comprising one or more ribs connected to the front touch portion, the left touch portion and/or the right touch portion and traversing to the touch wrist portion of the touch base, wherein the ribs have a curved contour for accommodating a user's hand grasping the upper surface of the touch computer mouse; and c) at least one wrist clamp or wrist strap connected to a left side and a right side of the touch wrist portion, wherein the at least one wrist clamp or wrist strap comprises a fastener capable of being latched about a user's wrist, wherein the touch computer mouse is engaged with a wrist and hand of the user via the at least one wrist clamp or wrist strap and the at least one wrist clamp or wrist strap fastener and the touch computer mouse cage whereby the one or more ribs traverse with the curved contour over a back of the hand of the user grasping the touch computer mouse, and wherein the touch computer mouse is manually operated by the user's hand in any position relative to a user's body.

BRIEF DESCRIPTION OF THE DRAWINGS

FIG. 5A is a top view illustration of a rollerball computer mouse 700 comprising an rollerball computer mouse cage comprising one or more ribs 701 and 716 and a wrist clamp or wrist strap 703.

DETAILED DESCRIPTION OF THE EMBODIMENTS

The following is a detailed description of certain specific embodiments of the computer mouse device, rollerball computer mouse and touch computer mouse as disclosed herein.

In one aspect, disclosed herein is a computer mouse device, comprising: a) a base comprising a mouse pad portion, front mouse pad portion, a left mouse pad portion, a right mouse pad portion, a wrist portion, one or more wrist portion mounts, one or more rib mounts, a top surface and a bottom surface; b) an optical computer mouse cage comprising one or more ribs connected to the front mouse pad portion, the left mouse pad portion and/or the right mouse pad portion and traversing to the wrist portion of the base, wherein the ribs have a curved contour for accommodating an optical computer mouse positioned at the mouse pad portion grasped by a user's hand; and c) at least one wrist clamp or wrist strap connected to a left side and a right side of the wrist portion, wherein the at least one wrist clamp or wrist strap comprises a fastener capable of being latched about a user's wrist, wherein the computer mouse device is engaged with a wrist and hand of the user via the at least one wrist clamp or wrist strap and the at least one wrist clamp or wrist strap fastener and the optical computer mouse cage whereby the one or more ribs traverse with the curved contour over a back of the hand of the user grasping the optical computer mouse, wherein the optical computer mouse is positioned on the mouse pad portion of the base portion and manually operated by the user's hand in any position relative to a user's body, and wherein the optical computer mouse cage is capable of holding the optical mouse being grasped by the hand of the user against the mouse pad portion for moving and controlling the positioning of a cursor on a video display screen.

Figure 1A:
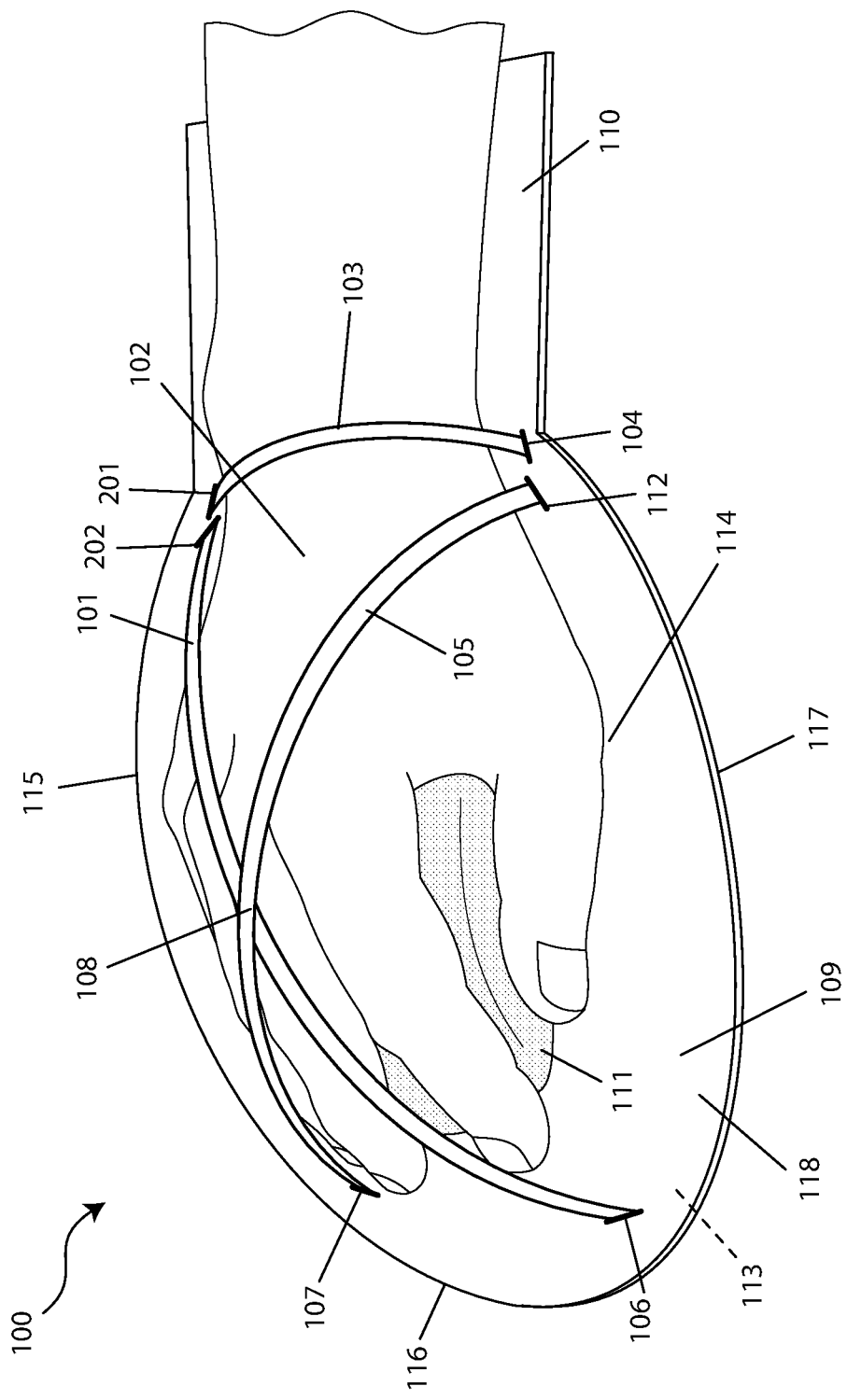
FIG. 1A is a top view illustration of a computer mouse device 100 comprising an optical computer mouse cage comprising one or more ribs 101 and 105 and a wrist clamp or wrist strap 103.
Figure 1B:
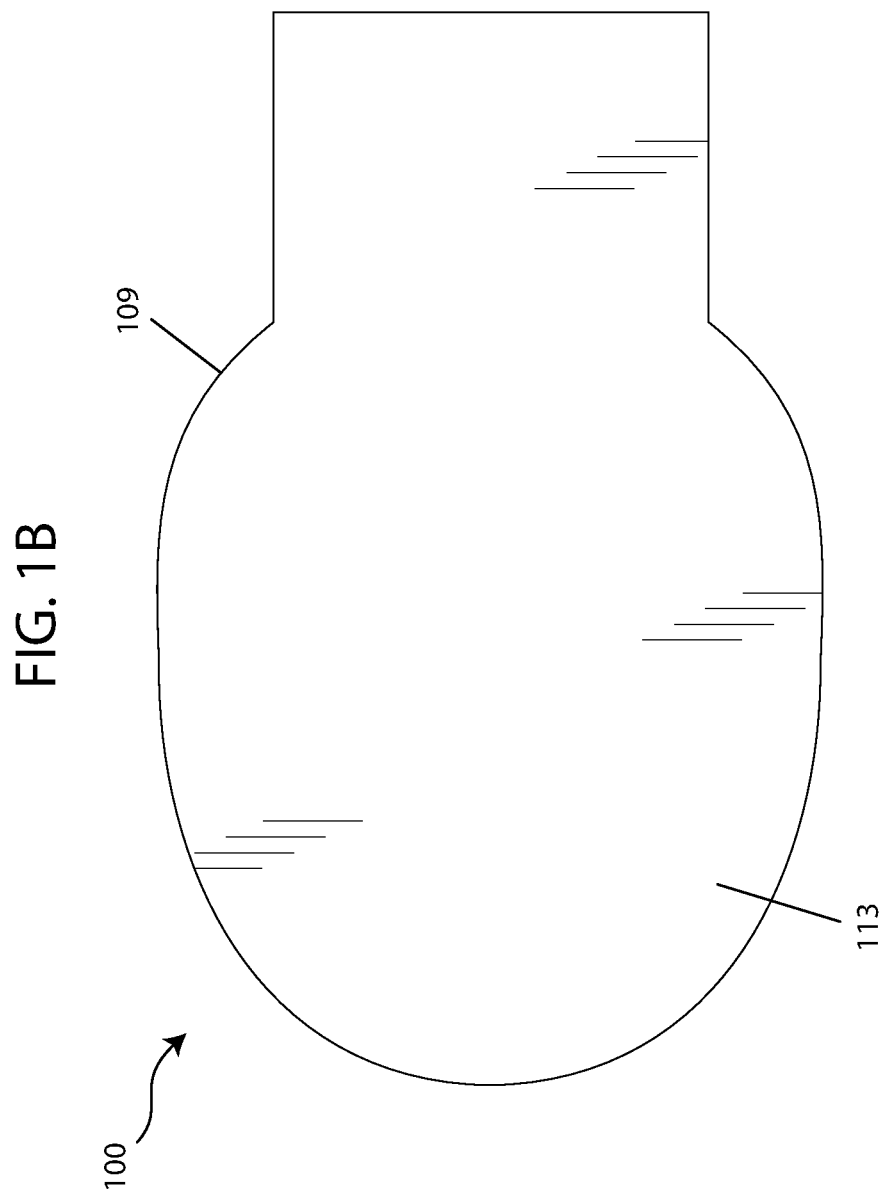
FIG. 1B is a bottom view illustration of a computer mouse device 100 comprising bottom surface 113.
Figure 2:
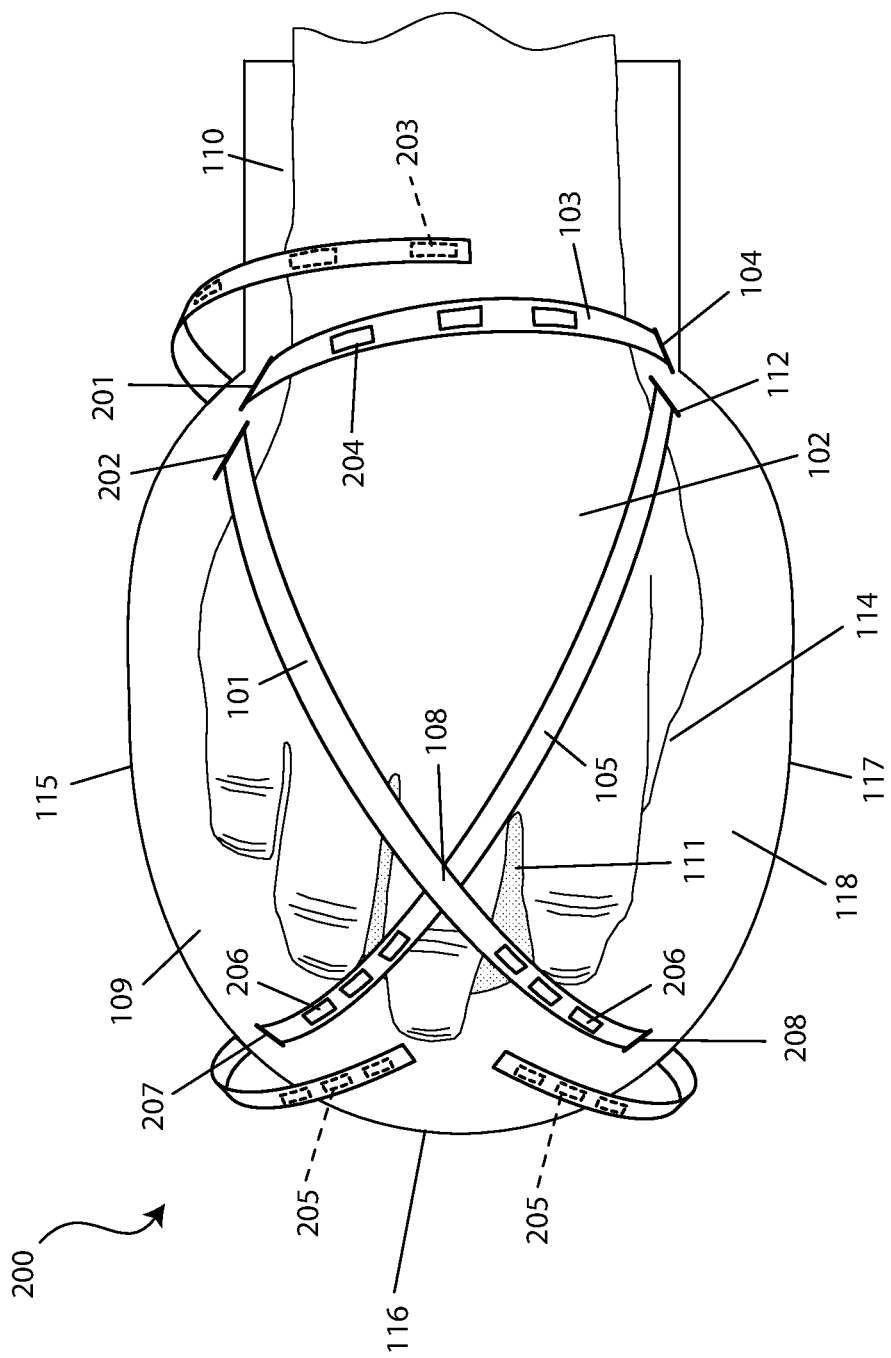
FIG. 2 is a top view illustration of a computer mouse device 200 comprising an optical computer mouse cage comprising one or more ribs 101 and 105 and a wrist clamp or wrist strap 103.

Turning to the figures, FIGS. 1A, 1B and 2 depict a computer mouse device 100 comprising an optical computer mouse cage comprising one or more ribs 105 and 101 and a wrist clamp or wrist strap 103. The wrist clamp or wrist strap 103 comprises a fastener for securing the wrist clamp or wrist strap 103 around a user's wrist. As shown the palm of the user's hand is in operation with the optical computer mouse 111, whereby ribs 105 and 101 have a curved contour for accommodating an optical computer mouse 111 positioned at the mouse pad portion 114 grasped by a user's hand 102. In some embodiments, the computer mouse device 100 comprises a base 109 comprising a mouse pad portion 114, front mouse pad portion 116, a left mouse pad portion 117, a right mouse pad portion 115, a wrist portion 110, one or more wrist portion mounts 104 and 201, an optical computer mouse cage comprising one or more ribs 105 and 101, a top surface 118 and a bottom surface 113. In some embodiments, the wrist portion 110 has length of between about 0.5 inches and 6 inches. In some embodiments, the base 109 is a flat surface that may be comprised of a lightweight solid material with an inner portion similar to that of a mouse pad such as carbon fiber, rubber, silicone, cloth, fiber or microfiber, foam, plastic, 3-D cloth, high-density processed cloth materials, finely textured material, plastic assembly, etc. In some embodiments, the base 109 is comprised of rubber, silicon, steel, aluminum, carbon fiber, plastic or a combination thereof. In some embodiments, the ribs 105 and 101 are comprised of rubber, silicon, magnetic materials, steel, aluminum, carbon fiber, plastic, nylon, textile materials, cotton or a combination thereof. In some embodiments, the ergonomic computer mouse device comprises that the mouse pad portion has a diameter between about 4 inches and 10 inches. Moreover, the ergonomic computer mouse device 100 comprises at least one wrist clamp or wrist strap 103 connected to a left side and a right side of the wrist portion 110. In some embodiments, the ergonomic computer mouse device comprises that the at least one wrist clamp or wrist strap comprises a flexible strap that extends from the one or more wrist portion mounts and through which the user's wrist is attached, wherein a palm of the user's hand can grip the optical computer mouse on the mouse pad portion and between the mouse pad portion and the optical computer mouse cage. The user attaches the computer mouse device 100 by sliding a hand grasping the optical mouse into the computer mouse cage comprising one or more ribs 105 and 101 and a wrist clamp or wrist strap 103 and then securing the wrist clamp or wrist strap 103 via a wrist strap magnetic fastener 203 and 204. In some embodiments, the wrist strap 103 comprises adjustment via wrist strap magnetic fastener 203 and 204. In some embodiments, the computer mouse device comprises slit 104, whereby the wrist strap 103 comprises adjustment via wrist strap magnetic fastener 203 and 204. In some embodiments, the wrist strap 103 is adjustable for small, medium and large user hands. In some embodiments, the wrist clamp or wrist strap 103 is comprised of rubber, silicon, steel, aluminum, carbon fiber, plastic, nylon, magnetic materials, textile materials, cotton or a combination thereof. In some embodiments, the wrist strap fastener comprises prongs and holes, at least one snap, at least one button, at least one magnet, at least one clasp, at least one tension mechanism, or at least one Velcro™ or similar fastener. In some embodiments, the wrist strap fastener comprises magnetic tabs 203 and 204. Moreover, the wrist clamp or wrist strap 103 is affixed 201 via a fastener or molded to the wrist portion 110. The ribs 105 and 101 are affixed 104 and 106, and 107 and 202 depicted with FIG. 1A via a fastener or molded with the base 109, whereby the one or more ribs 105 and 101 traversing with the curved contour over a back of the hand 102 of the user grasping the optical computer mouse 111. In some embodiments, the computer mouse device comprises that the one or more ribs of the optical computer mouse cage comprise one rib connected to a left front portion of the mouse pad portion and connected to a right wrist portion mount and/or one rib connected to a right front portion of the mouse pad portion and connected to a left wrist portion mount. In some embodiments, the computer mouse device 100 comprises ribs 105 or 101. In some embodiments, the computer mouse device comprises that the one or more ribs of the optical computer mouse cage comprise one rib connected to a left front portion of the mouse pad portion and connected to the at least one wrist clamp or wrist strap and/or one rib connected to a right front portion of the mouse pad portion and connected to the at least one wrist clamp or wrist strap. In some embodiments, the computer mouse device 100 comprises more than two ribs. In some embodiments, the computer mouse device 100 comprises ribs 105 or 101 comprising an overlapping portion 108, whereby the ribs 105 or 101 may be connected for added rigidity. In some embodiments, one or multiple lightweight ribs 105 or 101 are affixed along any point of the perimeter of the base 109 to and about a user's hand and/or wrist in a light comfortable but secure way so that the arm and hand holding the mouse can be moved at any angle relative to a user's body while operating the mouse and the computer mouse cage does not disconnect. The ribs 105 or 101 may be adjustable for small, medium and large user hands. In some embodiments, the ribs 105 and/or 101 comprise adjustment via magnetic tabs 205 and 206. In some embodiments, the computer mouse device comprises slits 207 and 208, whereby the ribs 105 and/or 101 comprise adjustment via magnetic tabs 205 and/or 206. In some embodiments, the ribs 105 and/or 101 are sized for small, medium and large user hands.

Figure 3:
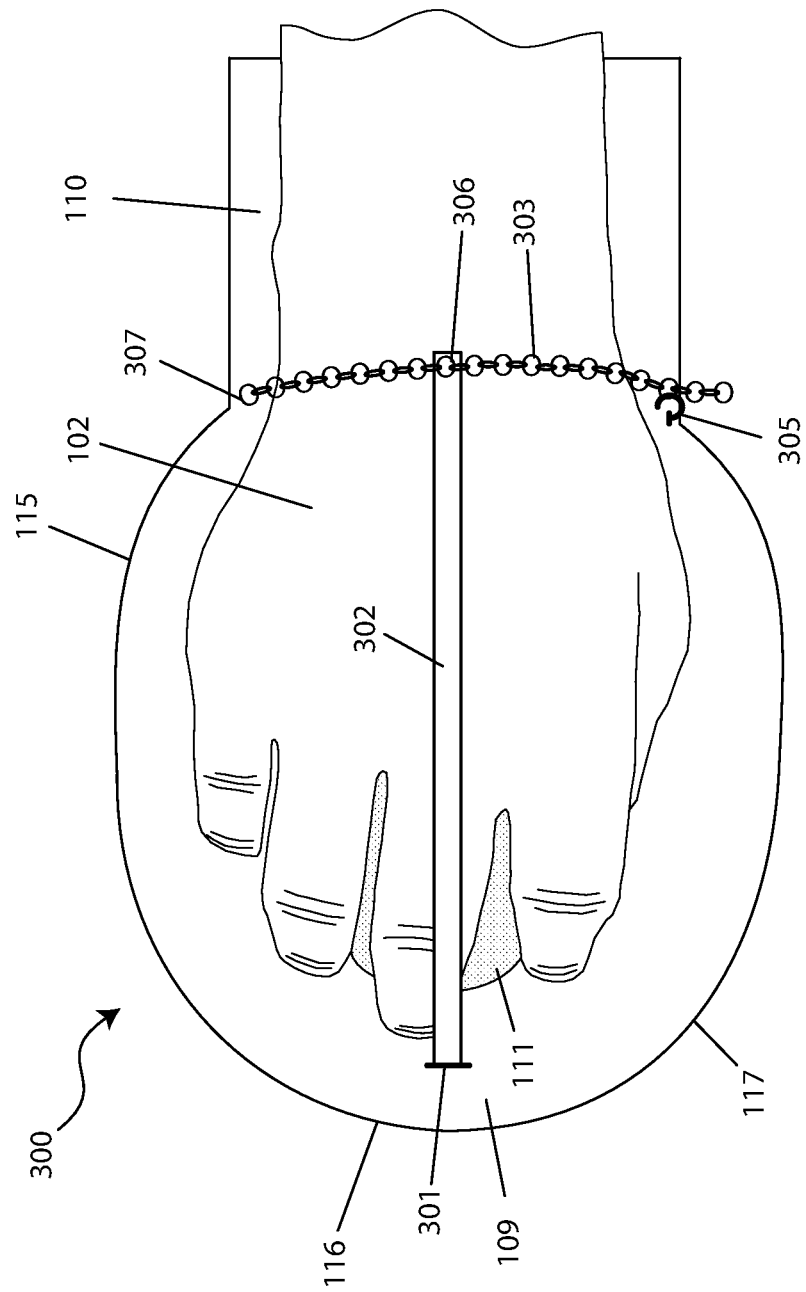
FIG. 3 is an illustration of an computer mouse device 300 comprising an optical computer mouse cage comprising one or more ribs 302 and a wrist clamp or wrist strap 303.

As depicted in FIG. 3, the computer mouse device 300 comprising an optical computer mouse cage comprising one or more ribs 302 and a wrist clamp or wrist strap 303. In some embodiments, the computer mouse device comprises that the one or more ribs of the optical computer mouse cage comprise one rib connected to a center front portion of the mouse pad portion and connected to the at least one wrist clamp or wrist strap. As illustrated, the ergonomic computer mouse device 300 comprises rib 302 affixed 301 to the front mouse pad portion 116 traversing with the curved contour over a back of the hand 102 of the user grasping the optical computer mouse 111. In this example, the rib 302 is affixed 306 to a wrist strap 303, wrist clamp or wrist strap 303 and then securing the wrist clamp or wrist strap 303 via a wrist strap clasp fastener 305, whereby the securing the wrist clamp or wrist strap 303 is affixed 307 to the to the wrist portion 110.

Figure 4:
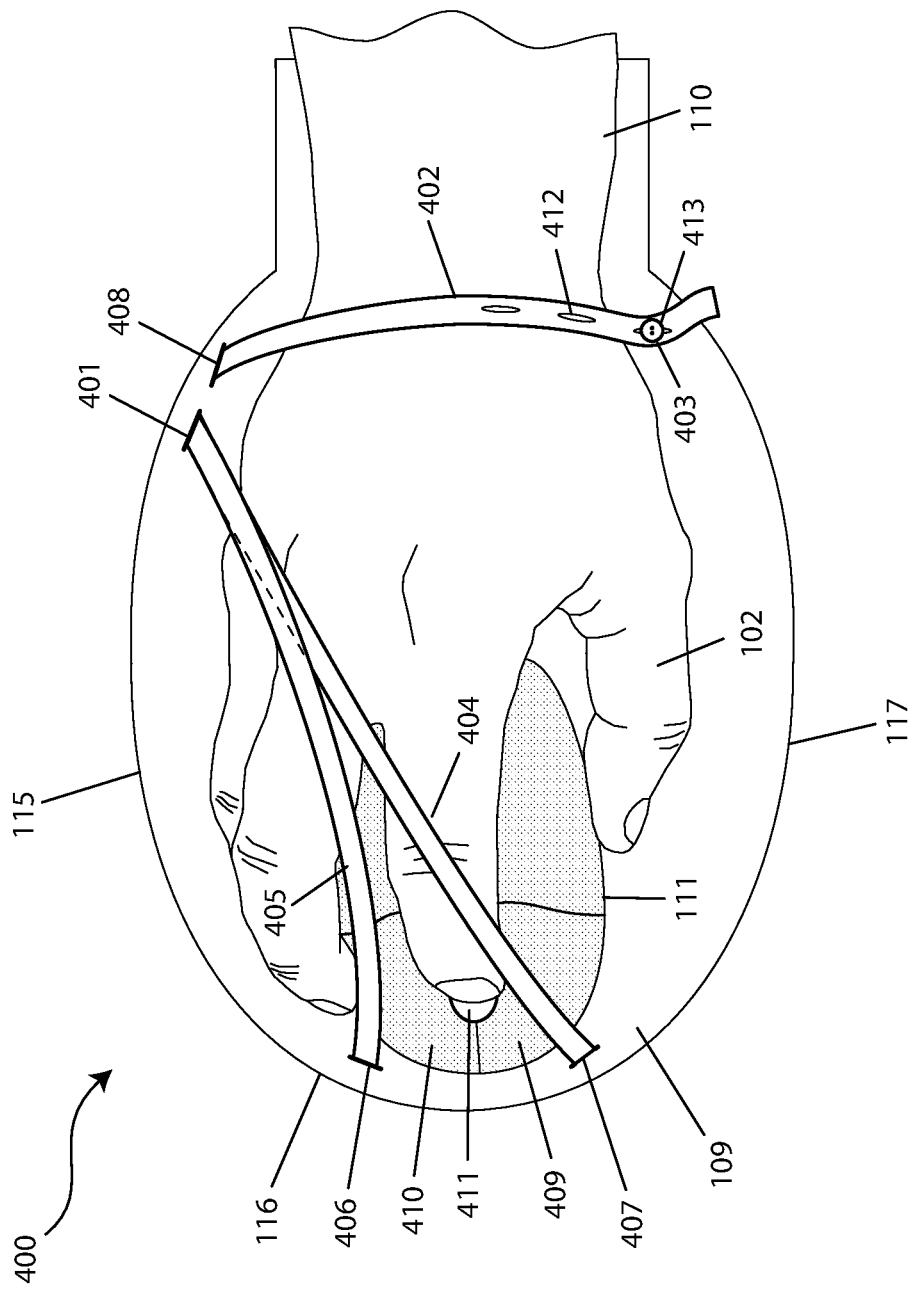
FIG. 4 is an illustration of an computer mouse device 400 comprising an optical computer mouse cage comprising one or more ribs 404 and 405 and a wrist clamp or wrist strap 402.

As depicted in FIG. 4, the computer mouse device 400 comprising an optical computer mouse cage comprising one or more ribs 404 and 405 and a wrist clamp or wrist strap 402. Moreover, the optical computer mouse 111 may have a left button 409, right button 410 and a scroll wheel 411 for moving and controlling the positioning of a cursor on a video display screen. In this example, the computer mouse device 400 comprises a wrist clamp or wrist strap 402 that is affixed 408 to the base portion on the same side wrist portion 110. As illustrated, the computer mouse device 400 comprises ribs 404 and 405 are affixed 406 and 407 via a fastener or molded with the front mouse pad portion 116 and traversing with the curved contour over a back of the hand 102 of the user grasping the optical computer mouse 111. In this example, the ribs 404 and 405 are affixed 401 via a fastener or molded with the base 109. In some embodiments, the wrist clamp or wrist strap 402 is comprised of rubber, silicon, steel, aluminum, carbon fiber, plastic, nylon, magnetic materials, textile materials, cotton or a combination thereof. In some embodiments, the wrist strap fastener 403 comprises prongs and holes, at least one snap, at least one button 413 and plurality of button holes 412, at least one magnet, at least one clasp, at least one tension mechanism, or at least one Velcro™ or similar fastener. In some embodiments, the ribs 404 and 405 are comprised of rubber, silicon, magnetic materials, steel, aluminum, carbon fiber, plastic, nylon, textile materials, cotton or a combination thereof.

In another aspect disclosed herein is a rollerball computer mouse, comprising: a) a rollerball base comprising a front rollerball portion, a left rollerball portion, a right rollerball portion, a rollerball wrist portion, one more wrist portion mounts, one or more rib mounts, an upper surface and a bottom surface; b) a rollerball computer mouse cage comprising one or more ribs connected to the front rollerball portion, the left rollerball portion and/or the right rollerball portion and traversing to the rollerball wrist portion of the rollerball base, wherein the ribs have a curved contour for accommodating a user's hand grasping the upper surface of the rollerball computer mouse; and c) at least one wrist clamp or wrist strap connected to a left side and a right side of the rollerball wrist portion, wherein the at least one wrist clamp or wrist strap comprises a fastener capable of being latched about a user's wrist, wherein the rollerball computer mouse is engaged with a wrist and hand of the user via the at least one wrist clamp or wrist strap and the at least one wrist clamp or wrist strap fastener and the rollerball computer mouse cage whereby the one or more ribs traverse with the curved contour over a back of the hand of the user grasping the rollerball computer mouse, wherein the rollerball computer mouse is manually operated by the user's hand in any position relative to a user's body, and wherein the rollerball computer mouse cage is capable of holding the rollerball computer mouse being grasped by the hand of the user for moving and controlling the positioning of a cursor on a video display screen.

Figure 5B:
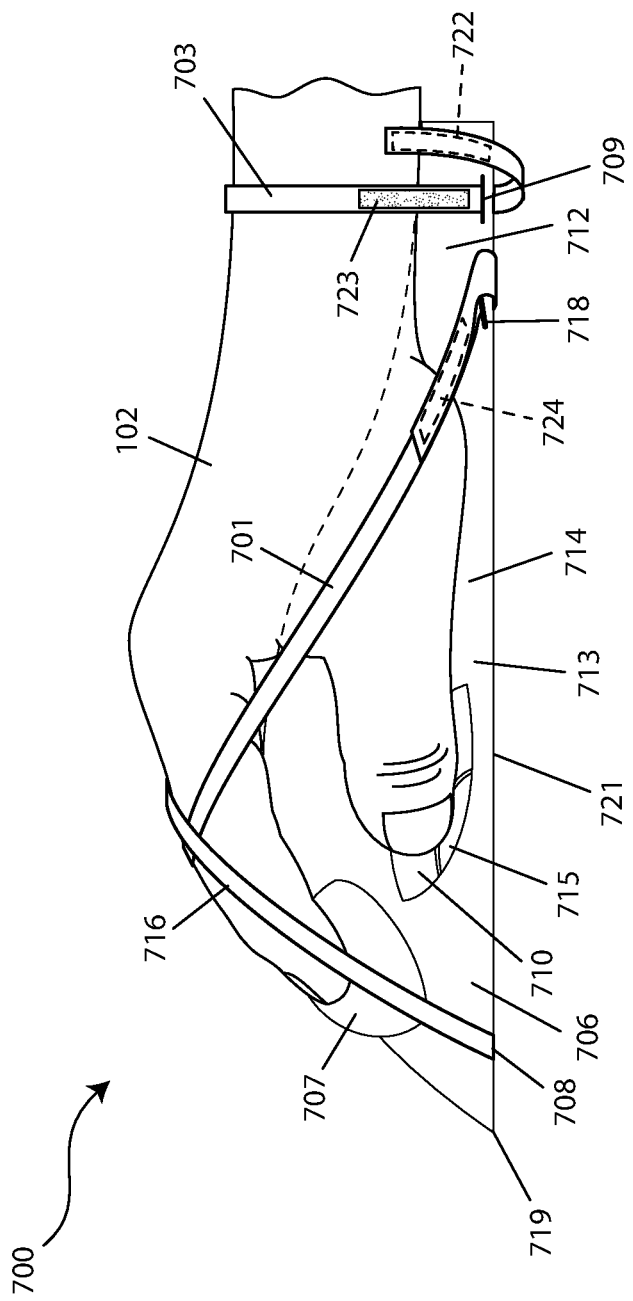
FIG. 5B is a left side view illustration of a rollerball computer mouse 700 comprising an rollerball computer mouse cage comprising one or more ribs 701 and 716 and a wrist clamp or wrist strap 703.

Turning to the drawings, FIGS. 5A and 5B are illustrations of a rollerball computer mouse 700, comprising a rollerball base 713 comprising a front rollerball portion 719, a left rollerball portion 714, a right rollerball portion 711, a rollerball wrist portion 712, one more wrist portion mounts 705 and 709, one or more rib mounts 708 and 704, and 717 and 718, an upper surface 720 and a bottom surface 721. The rollerball computer mouse 700 comprises a rollerball computer mouse cage comprising one or more ribs 701 and 716 and a wrist clamp or wrist strap 703. The ribs 701 and 716 are affixed 708 and 717 via a fastener or molded with the base 713, whereby the one or more ribs 701 and 716 traverse with the curved contour over a back of the hand 102 of the user grasping the rollerball computer mouse 111. In some embodiments, the ribs 701 and/or 716 comprise adjustment via Velcro™ tabs 724 and 725. In some embodiments, the rollerball computer mouse comprises slits 704 and 718, whereby the ribs 701 and/or 716 comprise adjustment via Velcro™ tabs 724 and/or 725. In some embodiments, the ribs 701 and/or 716 are sized for small, medium and large user hands. In some embodiments, the ribs 701 and/or 716 are sized for small, medium and large user hands and are nonadjustable. In some embodiments, the ribs 701 and 716 are comprised of steel, aluminum, carbon fiber, plastic, nylon, textile materials, cotton or a combination thereof. In some embodiments, one or multiple lightweight ribs 701 and 716 are affixed along any point of the perimeter of the base 713 to and about a user's hand and/or wrist in a light comfortable but secure way so that the arm and hand holding the mouse can be moved at any angle relative to a user's body while operating the mouse and the rollerball computer mouse 700 does not disconnect. The ribs 701 and 716 may be adjustable for small, medium and large user hands. In some embodiments, the ribs 701 and 716 are sized for small, medium and large user hands. In some embodiments, the rollerball computer mouse comprises that the one or more ribs of the rollerball computer mouse cage comprise one rib connected to a left front portion of the rollerball computer mouse and connected to a right wrist portion mount and/or a right front portion of the rollerball computer mouse and connected to a left wrist portion mount. In some embodiments, the rollerball computer mouse comprises that the one or more ribs of the rollerball computer mouse cage comprise one rib connected to a center front portion of the rollerball computer mouse and connected to the at least one wrist clamp or wrist strap. In some embodiments, the rollerball computer mouse comprises that the one or more ribs of the rollerball computer mouse cage comprise one rib connected to a left front portion of the rollerball computer mouse and connected to the at least one wrist clamp or wrist strap and/or one rib connected to a right front portion of the rollerball computer mouse and connected to the at least one wrist clamp or wrist strap. In some embodiments, the wrist clamp or wrist strap 703 is comprised of rubber, silicon, steel, aluminum, carbon fiber, plastic, nylon, magnetic materials, textile materials, cotton or a combination thereof. In some embodiments, the wrist strap fastener 705 comprises prongs and holes, at least one snap, at least one button, at least one magnet, at least one clasp, at least one tension mechanism, or at least one Velcro™ or similar fastener. Moreover, the wrist clamp or wrist strap 703 is affixed 709 via a Velcro™ fastener tabs 722 and 723 or molded to the wrist portion 712. In some embodiments, the wrist strap 703 comprises adjustment via wrist strap Velcro™ tabs 722 and 723. In some embodiments, the rollerball computer mouse comprises slit 709, whereby the wrist strap 703 comprises adjustment via wrist strap Velcro™ tabs 722 and 723. In some embodiments, the wrist strap 703 is adjustable for small, medium and large user hands. In some embodiments, the wrist portion 712 has length of between about 0.5 inches and 6 inches. In some embodiments, the rollerball computer mouse comprises that the at least one wrist clamp or wrist strap comprises a flexible strap that extends from the one more wrist portion mounts and through which the user's wrist is attached, wherein a palm of the user's hand can grip the rollerball computer mouse between the rollerball computer mouse cage and the upper surface of the rollerball computer mouse. As depicted the rollerball computer mouse 700 comprises a housing 706, a rollerball 707, one or more buttons 710 and 715 for moving and controlling the positioning of a cursor on a video display screen.

In yet another aspect disclosed herein is a touch computer mouse, comprising: a) a touch base comprising a front touch portion, a left touch portion, a right touch portion, a touch wrist portion, one more wrist portion mounts, one or more rib mounts, an upper surface and a bottom surface; b) a touch computer mouse cage comprising one or more ribs connected to the front touch portion, the left touch portion and/or the right touch portion and traversing to the touch wrist portion of the touch base, wherein the ribs have a curved contour for accommodating a user's hand grasping the upper surface of the touch computer mouse; and c) at least one wrist clamp or wrist strap connected to a left side and a right side of the touch wrist portion, wherein the at least one wrist clamp or wrist strap comprises a fastener capable of being latched about a user's wrist, wherein the touch computer mouse is engaged with a wrist and hand of the user via the at least one wrist clamp or wrist strap and the at least one wrist clamp or wrist strap fastener and the touch computer mouse cage whereby the one or more ribs traverse with the curved contour over a back of the hand of the user grasping the touch computer mouse, wherein the touch computer mouse is manually operated by the user's hand in any position relative to a user's body, and wherein the touch computer mouse cage is capable of holding the touch computer mouse being grasped by the hand of the user for moving and controlling the positioning of a cursor on a video display screen.

Figure 6A:
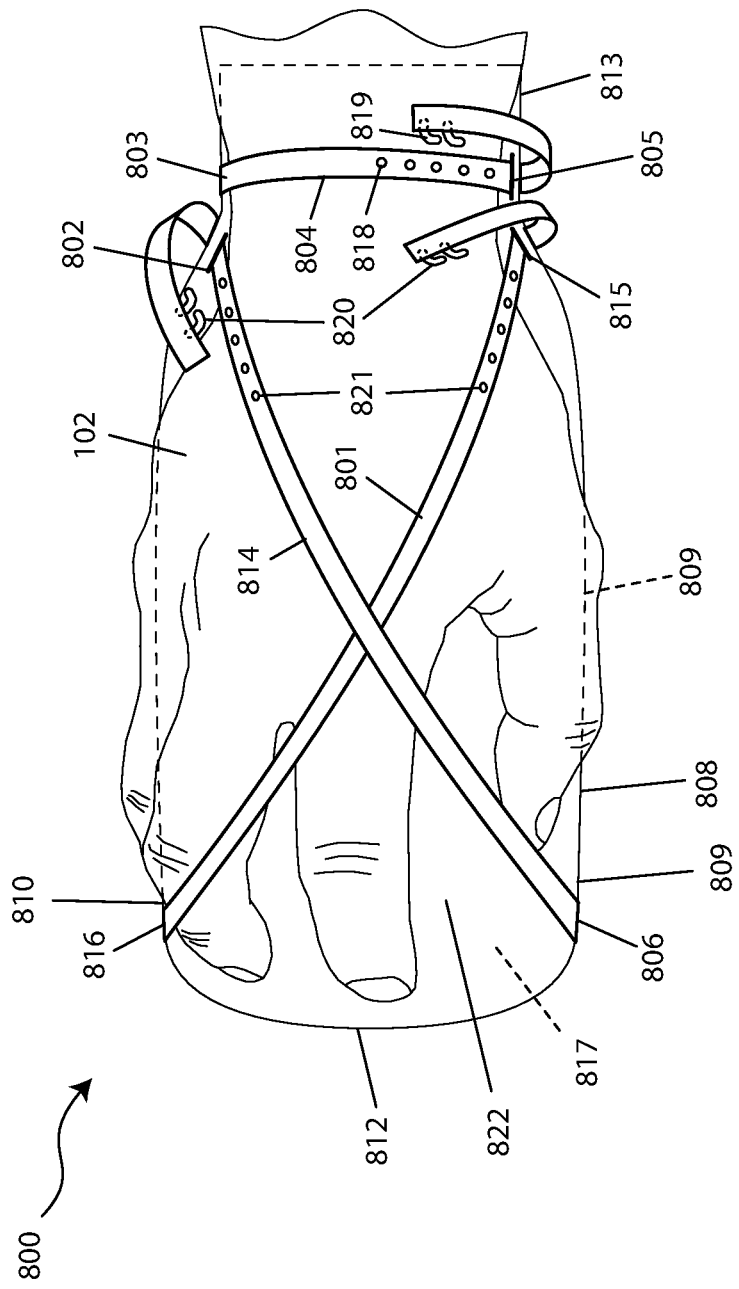
FIG. 6A is a top view illustration of a touch computer mouse 800 comprising an touch computer mouse cage comprising one or more ribs 801 and 814 and a wrist clamp or wrist strap 804.
Figure 6B:
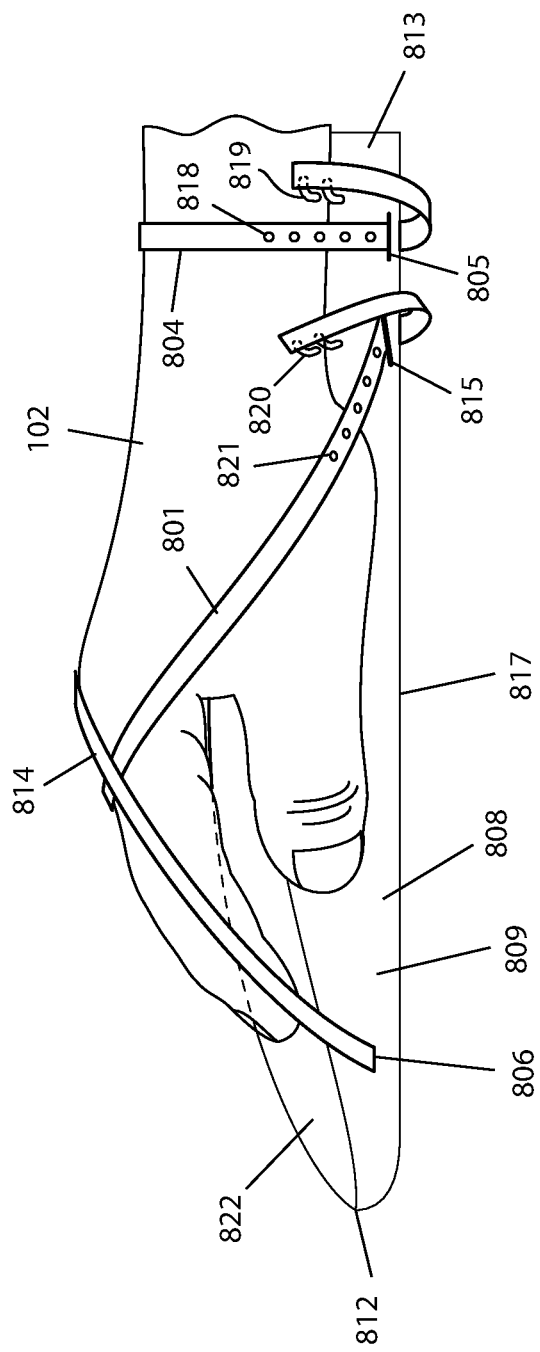
FIG. 6B is a left side view illustration of a touch computer mouse 800 comprising an touch computer mouse cage comprising one or more ribs 801 and 814 and a wrist clamp or wrist strap 804.

Turning to the drawings, FIGS. 6A and 6B are illustrations of a touch computer mouse 800, comprising an touch computer mouse cage comprising one or more ribs 801 and 814 and a wrist clamp or wrist strap 804. In some embodiments, the wrist clamp or wrist strap 804 is comprised of rubber, silicon, steel, aluminum, carbon fiber, plastic, nylon, magnetic materials, textile materials, cotton or a combination thereof. In some embodiments, the wrist strap fastener 805 comprises prongs and holes, at least one snap, at least one button, at least one magnet, at least one clasp, at least one tension mechanism, or at least one Velcro™ or similar fastener. Moreover, the wrist clamp or wrist strap 804 is affixed 803 via a fastener or molded to the wrist portion 813. In some embodiments, the wrist strap 804 comprises adjustment via wrist strap prongs and holes 819 and 818, respectively. In some embodiments, the touch computer mouse comprises slit 805, whereby the wrist strap 804 comprises adjustment via wrist strap prongs and holes 819 and 818. In some embodiments, the wrist strap 804 is adjustable for small, medium and large user hands. In some embodiments, the touch computer mouse comprises that the at least one wrist clamp or wrist strap comprises a flexible strap that extends from the one or more wrist portion mounts and through which the user's wrist is attached, wherein a palm of the user's hand can grip the touch computer mouse between the touch computer mouse cage and the touch surface of the touch computer mouse. The touch computer mouse, comprises a touch base 808 comprising a front touch portion 812, a left touch portion 809, a right touch portion 810, a touch wrist portion 813, one more wrist portion mounts 805 and 803, one or more rib mount positions 816 and 815, and 806 and 802, an touch surface 822 and a bottom surface 817. The ribs 801 and 814 are affixed via a fastener or molded with the touch base 808 at positions 816 and 815, and 806 and 802. The touch computer mouse 800 comprises a touch computer mouse cage comprising one or more ribs 801 and 814 connected to the front touch portion, the left touch portion 809 and/or the right touch portion 810 and traversing to the touch wrist portion 813 of the touch base 808, wherein the ribs 801 and 814 have a curved contour for accommodating a user's hand 102 grasping the touch surface 822 of the touch computer mouse 800. In some embodiments, the wrist portion 813 has length of between about 0.5 inches and 6 inches. In some embodiments, the ribs 801 and 814 are comprised of rubber, silicon, steel, aluminum, carbon fiber, plastic, nylon, textile materials, cotton or a combination thereof. In some embodiments, one or multiple lightweight ribs 801 and 814 are affixed along any point of the perimeter of the touch base 808 to and about a user's hand and/or wrist in a light comfortable but secure way so that the arm and hand holding the mouse can be moved at any angle while operating the mouse and the computer mouse cage does not disconnect. In some embodiments, the ribs 801 and/or 814 comprise adjustment via prongs and holes 820 and 821. In some embodiments, the rollerball computer mouse comprises slits 802 and 815, whereby the ribs 801 and/or 814 comprise adjustment via prongs and holes 820 and 821. In some embodiments, the ribs 801 and/or 814 are sized for small, medium and large user hands. In some embodiments, the ribs 801 and/or 814 are sized for small, medium and large user hands and are nonadjustable. In some embodiments, the touch computer mouse comprises that the one or more ribs of the touch computer mouse cage comprise one rib connected to a left front portion of the touch computer mouse and connected to a right wrist portion mount and/or a right front portion of the touch computer mouse and connected to a left wrist portion mount. In some embodiments, the touch computer mouse comprises that the one or more ribs of the touch computer mouse cage comprise one rib connected to a center front portion of the touch computer mouse and connected to the at least one wrist clamp or wrist strap. In some embodiments, the touch computer mouse comprises that the one or more ribs of the touch computer mouse cage comprise one rib connected to a left front portion of the touch computer mouse and connected to the at least one wrist clamp or wrist strap and/or one rib connected to a right front portion of the touch computer mouse and connected to the at least one wrist clamp or wrist strap. As depicted the touch computer mouse 800 comprises a touch surface 822 for moving and controlling the positioning of a cursor on a video display screen.

The computer mouse cage affords a cavity that allows for a user to operate the various scroll options and click-buttons of the computer mouse. The design of the computer mouse devices herein may also be purposely enhanced for specific mouse uses, such as office and professional use, home or gaming use, and may be enhanced with possible sensor-reactive coating, anti-microbial fabric or matter, 3D and 4D capabilities etc. as technology advances. The computer mouse cage will allow for the hand to control the mouse in any position and at any angle on any axis, providing relief from long-term holds of strenuous positions. In some embodiments, the computer mouse device, rollerball computer mouse and touch computer mouse disclosed herein may be wired or wireless.

As disclosed herein the computer mouse cage attaches to a user's wrist or in close proximity to a user's wrist similar to a bracelet or watch, whereby a hand grasping the mouse slips inside the mouse cage, whereby the wrist strap closes over the wrist with a prongs and holes, snap, button, magnet, clasp, tension mechanism, Velcro™ or any other suitable mechanism.

The advantage of the computer mouse cage disclosed herein is that it is designed to alleviate or reduce shoulder, tendon, elbow, arm, wrist and hand pain associated with long-term use of a tabletop computer mouse. Common conditions include various musculoskeletal injuries, such as repetitive strain injuries, carpal tunnel syndrome, tennis elbow, shoulder rotator cuff injury, muscle spasm or strain, tendonitis, ligament strains and/or joint dysfunction, but also arthritis, distress and displacements of the hand, wrist, arm, elbow, shoulder and back areas. For example, the computer mouse cage may be used with a straight-arm position hanging on the side of user's chair to respect the body's natural position alleviating the above conditions.

Computer System

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 7:
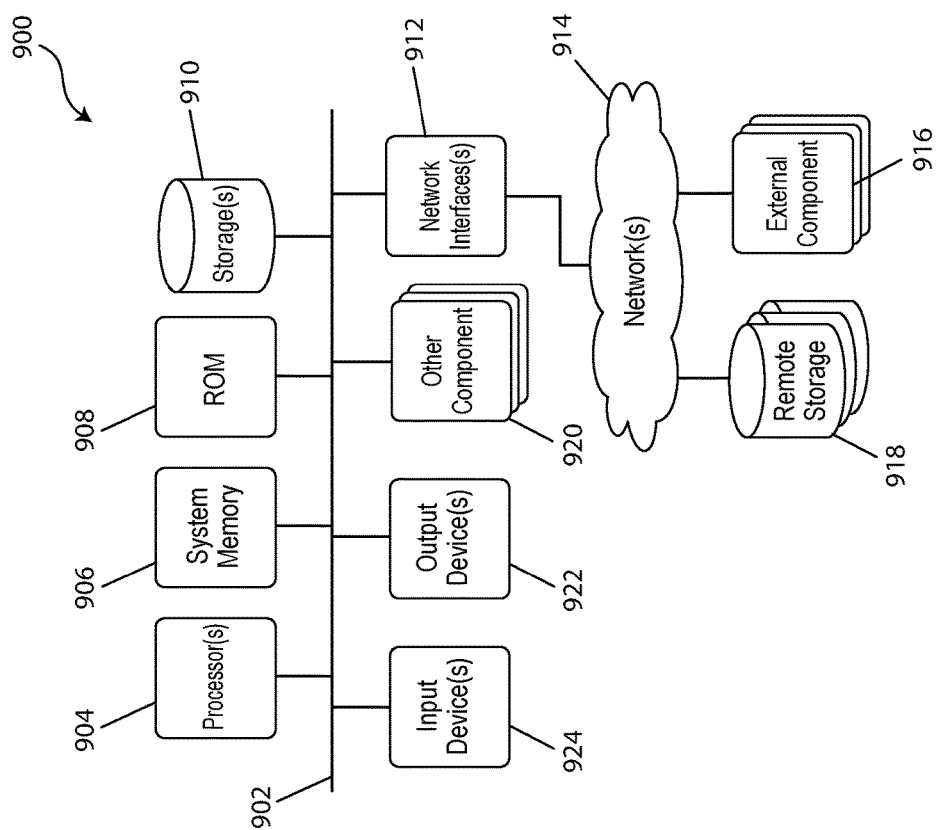
FIG. 7 illustrates a schematic block diagram of a conceptual computer system 900 used to implement some embodiments. For example, the device described above in reference to FIGS. 1A, 1B, 2-4, 5A, 5B, 6A and 6B may be at least partially implemented using computer system 900.

Referring to the drawings, FIG. 7 illustrates a schematic block diagram of a conceptual computer system 900 used to implement some embodiments. For example, the system described above in reference to FIGS. 1-6 may be at least partially implemented using all or a portion of computer system 900.

Computer system 900 may be implemented using various appropriate devices. For instance, the computer system may be implemented using one or more vehicle display units, personal computers (PCs), servers, mobile devices (e.g., a smartphone), tablet devices, and/or any other appropriate devices. The various devices may work alone (e.g., the computer system may be implemented as a vehicle display unit) or in conjunction (e.g., some components of the computer system may be provided by a vehicle display unit while other components may be provided by a tablet device).

As shown, computer system 900 may include at least one communication bus 902, one or more processors 904, a system memory 906, a read-only memory (ROM) 908, permanent storage devices 910, input devices 924, output devices 922, various other components 920 (e.g., a graphics processing unit), and one or more network interfaces 912 and may include a network 914, corresponding remote storage 918 and a corresponding external component 916.

Bus represents all communication pathways among the elements of computer system 900. Such pathways may include wired, wireless, optical, and/or other appropriate communication pathways. For example, input devices 924 and/or output devices 922 may be coupled to the system 900 using a wireless connection protocol or system.

The processor 904 may, in order to execute the processes of some embodiments, retrieve instructions to execute and/or data to process from components such as system memory 906, ROM 908, and permanent storage device 910. Such instructions and data may be passed over bus 902.

System memory 906 may be a volatile read-and-write memory, such as a random access memory (RAM). The system memory may store some of the instructions and data that the processor uses at runtime. The sets of instructions and/or data used to implement some embodiments may be stored in the system memory 906, the permanent storage device 910, and/or the read-only memory 908. ROM 908 may store static data and instructions that may be used by processor 904 and/or other elements of the computer system.

Permanent storage device 910 may be a read-and-write memory device. The permanent storage device may be a non-volatile memory unit that stores instructions and data even when computer system 900 is off or unpowered. Computer system 900 may use a removable storage device and/or a remote storage device as the permanent storage device.

Input devices 924 may enable a user to communicate information to the computer system and/or manipulate various operations of the system. The input devices may include keyboards, cursor control devices, audio input devices and/or video input devices. Output devices 922 may include printers, displays, and/or audio devices. Some or all of the input and/or output devices may be wirelessly or optically connected to the computer system.

Other components 920 may perform various other functions. These functions may include performing specific functions (e.g., graphics processing, sound processing, etc.), providing storage, interfacing with external systems or components, etc.

Referring to FIG. 7, computer system 900 may be coupled to one or more networks 914 through one or more network interfaces 912. For example, computer system 900 may be coupled to a web server on the Internet such that a web browser executing on computer system 900 may interact with the web server as a user interacts with an interface that operates in the web browser. Computer system 900 may be able to access one or more remote storages 918 and one or more external components 916 through the network interface 912 and network 914. The network interface(s) 912 may include one or more application programming interfaces (APIs) that may allow the computer system 900 to access remote systems and/or storages and also may allow remote systems and/or storages to access computer system 900 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 900 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

DEFINITIONS

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

The present disclosure is not to be limited in terms of the particular embodiments described in this application. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or devices, which can of course vary. It is also to be understood that the terminology used herein is for the purpose of describing particular embodiments only, and is not intended to be limiting.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict any definitions in this disclosure.

What is claimed is:

1. A computer mouse device, comprising:
    a) a base comprising a mouse pad portion, front mouse pad portion, a left mouse pad portion, a right mouse pad portion, a wrist portion, one or more wrist portion mounts, one or more rib mounts, a top surface and a bottom surface;
    b) an optical computer mouse cage comprising one or more ribs connected to the front mouse pad portion, the left mouse pad portion and/or the right mouse pad portion and traversing to the wrist portion of the base, wherein the ribs have a curved contour for accommodating an optical computer mouse positioned at the mouse pad portion grasped by a user's hand; and
    c) at least one wrist clamp or wrist strap connected to a left side and a right side of the wrist portion, wherein the at least one wrist clamp or wrist strap comprises a fastener capable of being latched about a user's wrist,
    wherein the computer mouse device is engaged with a wrist and hand of the user via the at least one wrist clamp or wrist strap and the at least one wrist clamp or wrist strap fastener and the optical computer mouse cage whereby the one or more ribs traverse with the curved contour over a back of the hand of the user grasping the optical computer mouse, wherein the optical computer mouse is positioned on the mouse pad portion of the base portion and manually operated by the user's hand in any position relative to a user's body, and wherein the wrist clamp or wrist strap is adjustable or nonadjustable and/or the one or more ribs is/are adjustable or nonadjustable.

2. The computer mouse device of claim 1, wherein the optical computer mouse cage is capable of holding the optical computer mouse being grasped by the hand of the user against the mouse pad portion for moving and controlling the positioning of a cursor on a video display screen.

3. The computer mouse device of claim 1, wherein the at least one wrist clamp or wrist strap comprises a flexible strap that extends from the one or more wrist portion mounts and through which the user's wrist is attached, wherein a palm of the user's hand can grip the optical computer mouse on the mouse pad portion and between the mouse pad portion and the optical computer mouse cage.

4. The computer mouse device of claim 1, wherein the one or more ribs of the optical computer mouse cage comprise one rib connected to a left front portion of the mouse pad portion and connected to a right wrist portion mount and/or one rib connected to a right front portion of the mouse pad portion and connected to a left wrist portion mount.

5. The computer mouse device of claim 1, wherein the one or more ribs of the optical computer mouse cage comprise one rib connected to a center front portion of the mouse pad portion and connected to the at least one wrist clamp or wrist strap.

6. The computer mouse device of claim 1, wherein the one or more ribs of the optical computer mouse cage comprise one rib connected to a left front portion of the mouse pad portion and connected to the at least one wrist clamp or wrist strap and/or one rib connected to a right front portion of the mouse pad portion and connected to the at least one wrist clamp or wrist strap.

7. The computer mouse device of claim 1, wherein the mouse pad portion has a diameter between about 4 inches and 10 inches.

8. A rollerball computer mouse, comprising:
a) a rollerball base comprising a front rollerball portion, a left rollerball portion, a right rollerball portion, a rollerball wrist portion, one or more wrist portion mounts, one or more rib mounts, an upper surface and a bottom surface;
b) a rollerball computer mouse cage comprising one or more ribs connected to the front rollerball portion, the left rollerball portion and/or the right rollerball portion and traversing to the rollerball wrist portion of the rollerball base, wherein the ribs have a curved contour for accommodating a user's hand grasping the upper surface of the rollerball computer mouse; and
c) at least one wrist clamp or wrist strap connected to a left side and a right side of the rollerball wrist portion, wherein the at least one wrist clamp or wrist strap comprises a fastener capable of being latched about a user's wrist,
wherein the rollerball computer mouse is engaged with a wrist and hand of the user via the at least one wrist clamp or wrist strap and the at least one wrist clamp or wrist strap fastener and the rollerball computer mouse cage whereby the one or more ribs traverse with the curved contour over a back of the hand of the user grasping the rollerball computer mouse, wherein the rollerball computer mouse is manually operated by the user's hand in any position relative to a user's body, and wherein the wrist clamp or wrist strap is adjustable or nonadjustable and/or the one or more ribs is/are adjustable or nonadjustable.

9. The rollerball computer mouse of claim 8, wherein the rollerball computer mouse cage is capable of holding the rollerball computer mouse being grasped by the hand of the user for moving and controlling the positioning of a cursor on a video display screen.

10. The rollerball computer mouse of claim 8, wherein the at least one wrist clamp or wrist strap comprises a flexible strap that extends from the one or more wrist portion mounts and through which the user's wrist is attached, wherein a palm of the user's hand can grip the rollerball computer mouse between the rollerball computer mouse cage and the upper surface of the rollerball computer mouse.

11. The rollerball computer mouse of claim 8, wherein the one or more ribs of the rollerball computer mouse cage comprise one rib connected to a left front portion of the rollerball computer mouse and connected to a right wrist portion mount and/or a right front portion of the rollerball computer mouse and connected to a left wrist portion mount.

12. The rollerball computer mouse of claim 8, wherein the one or more ribs of the rollerball computer mouse cage comprise one rib connected to a center front portion of the rollerball computer mouse and connected to the at least one wrist clamp or wrist strap.

13. The rollerball computer mouse of claim 8, wherein the one or more ribs of the rollerball computer mouse cage comprise one rib connected to a left front portion of the rollerball computer mouse and connected to the at least one wrist clamp or wrist strap and/or one rib connected to a right front portion of the rollerball computer mouse and connected to the at least one wrist clamp or wrist strap.

14. An touch computer mouse, comprising:
d) a touch base comprising a front touch portion, a left touch portion, a right touch portion, a touch wrist portion, one more wrist portion mounts, one or more rib mounts, an touch surface and a bottom surface;
e) a touch computer mouse cage comprising one or more ribs connected to the front touch portion, the left touch portion and/or the right touch portion and traversing to the touch wrist portion of the touch base, wherein the ribs have a curved contour for accommodating a user's hand grasping the touch surface of the touch computer mouse; and
f) at least one wrist clamp or wrist strap connected to a left side and a right side of the touch wrist portion, wherein the at least one wrist clamp or wrist strap comprises a fastener capable of being latched about a user's wrist,
wherein the computer mouse adaptor is engaged with a wrist and hand of the user via the at least one wrist clamp or wrist strap and the at least one wrist clamp or wrist strap fastener and the touch computer mouse cage whereby the one or more ribs traverse with the curved contour over a back of the hand of the user grasping the touch computer mouse, wherein the touch computer mouse is manually operated by the user's hand in any position relative to a user's body, and wherein the wrist clamp or wrist strap is adjustable or nonadjustable and/or the one or more ribs is/are adjustable or nonadjustable.

15. The touch computer mouse of claim 14, wherein the touch computer mouse cage is capable of holding the touch computer mouse being grasped by the hand of the user for moving and controlling the positioning of a cursor on a video display screen.

16. The touch computer mouse of claim 14, wherein the at least one wrist clamp or wrist strap comprises a flexible strap that extends from the one more wrist portion mounts and through which the user's wrist is attached, wherein a palm of the user's hand can grip the touch computer mouse between the touch computer mouse cage and the touch surface of the touch computer mouse.

17. The touch computer mouse of claim 14, wherein the one or more ribs of the touch computer mouse cage comprise one rib connected to a left front portion of the touch computer mouse and connected to a right wrist portion mount and/or a right front portion of the touch computer mouse and connected to a left wrist portion mount.

18. The touch computer mouse of claim 14, wherein the one or more ribs of the touch computer mouse cage comprise one rib connected to a center front portion of the touch computer mouse and connected to the at least one wrist clamp or wrist strap.

19. The touch computer mouse of claim 14, wherein the one or more ribs of the touch computer mouse cage comprise one rib connected to a left front portion of the touch computer mouse and connected to the at least one wrist clamp or wrist strap and/or one rib connected to a right front portion of the touch computer mouse and connected to the at least one wrist clamp or wrist strap.

\* \* \* \* \*